United States Patent [19]

Palmer

[11] Patent Number: 5,038,815

[45] Date of Patent: Aug. 13, 1991

[54] SCRUBBER AND MUFFLER FOR EXHAUST GAS FROM GAS-POWERED VALVE ACTUATORS

[76] Inventor: Thomas W. Palmer, Box 638, Fulshear, Tex. 77441

[21] Appl. No.: 571,763

[22] Filed: Aug. 23, 1990

[51] Int. Cl.⁵ .......................................... B01D 35/00
[52] U.S. Cl. .................................. 137/237; 55/316; 55/320; 55/462; 55/DIG. 21; 137/545; 181/230
[58] Field of Search ............... 55/316, 320, 462, 486, 55/DIG. 21; 137/237, 545; 181/230

[56] References Cited

U.S. PATENT DOCUMENTS

| | | | |
|---|---|---|---|
| 2,205,336 | 6/1940 | Beach | 55/462 X |
| 3,811,251 | 5/1974 | Gibel | 55/320 X |
| 3,845,840 | 11/1974 | Thrasher | 181/230 |
| 3,876,400 | 4/1975 | Frantz | 55/486 X |
| 3,890,123 | 6/1975 | Kuga | 55/486 X |
| 4,286,976 | 9/1981 | Eriksson | 55/DIG. 21 X |
| 4,380,325 | 4/1983 | Palmer | |
| 4,559,066 | 12/1985 | Hunter et al. | 55/316 X |
| 4,632,682 | 12/1986 | Erdmannsdorfer | 55/486 X |
| 4,666,473 | 5/1987 | Gerdau | 55/320 X |
| 4,971,612 | 11/1990 | Loughran | 55/320 |

OTHER PUBLICATIONS

"Mighty-Mic (FG-372-A) Filter Element," 1983, describing a gas filter.
"Line Break-ESD Systems, Inc.," 1989, describing valve actuators.

Primary Examiner—Gerald A. Michalsky
Attorney, Agent, or Firm—Guy McClung

[57] ABSTRACT

Methods and apparatuses for cleaning and/or muffling a gas discharge which in one aspect includes a hollow body with a filter element mounted therein through which the discharge gas flows and in which liquids entrained in the gas are filtered out, the body having one or more liquid collection areas from which liquid can be removed from the apparatus for disposal or for re-use. The apparatus also can serve as a noise muffler to reduce the noise level of the gas discharge.

13 Claims, 2 Drawing Sheets

FIG. 2
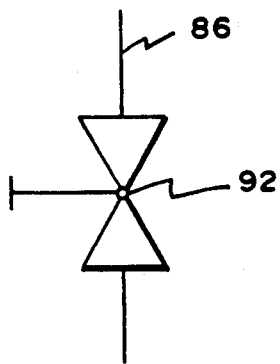
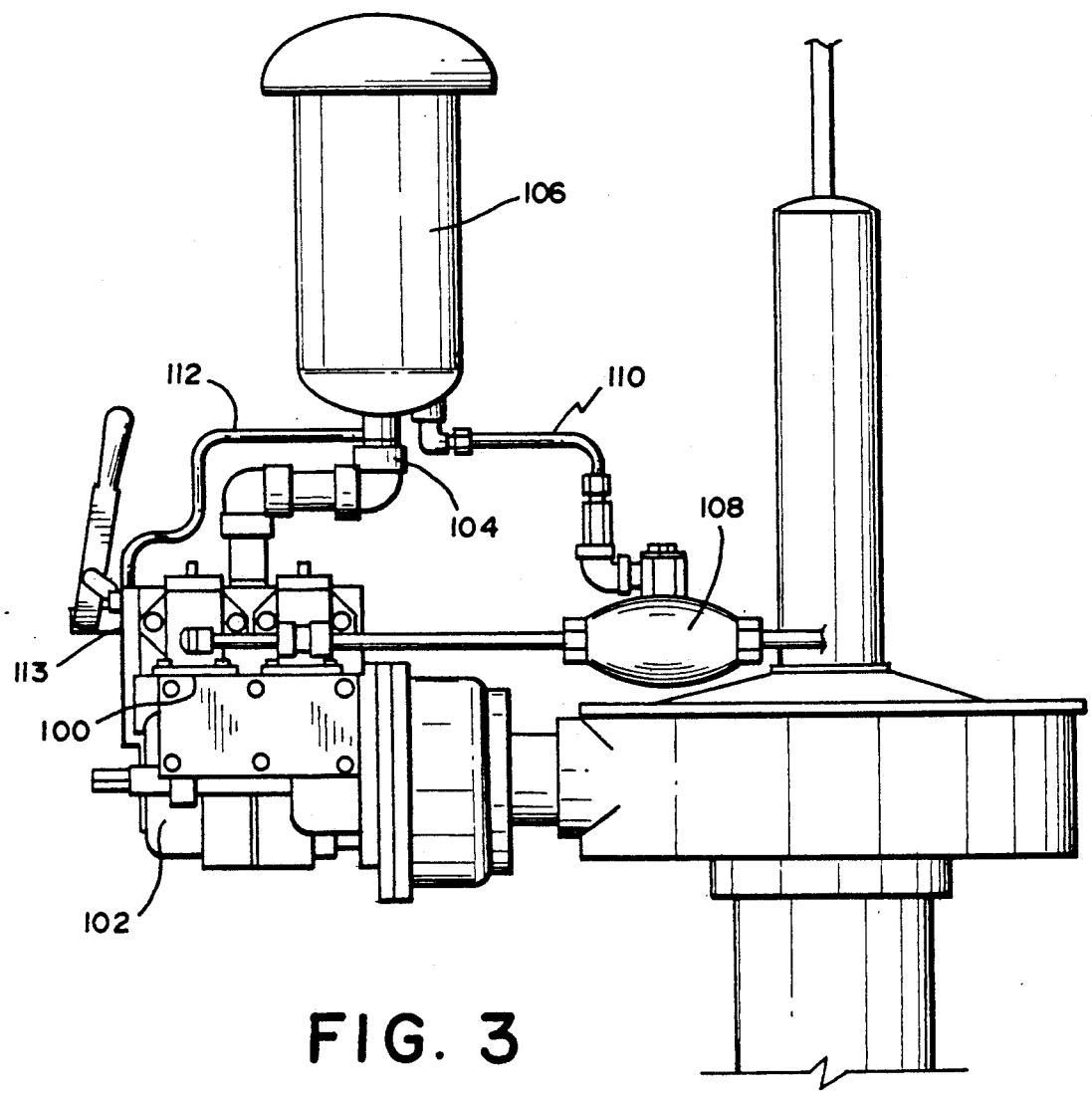
FIG. 3

SCRUBBER AND MUFFLER FOR EXHAUST GAS FROM GAS-POWERED VALVE ACTUATORS

BACKGROUND OF THE INVENTION

1. Field of the Invention

This invention is directed to devices and methods for cleaning gas and for muffling a gas discharge. In one particular aspect it is directed to cleaning and muffling the gas discharged from a gas-powered valve actuator for a valve on a natural gas pipeline. It is also directed to devices and methods which permit the environmentally safe re-use of actuator lubrication oil and the recovery of other materials which previously have been discharged into the environment.

2. Description of Related Art

Natural gas pipelines use gas-powered valve actuators to operate the valves used to control the flow of the natural gas. Pipeline valves may be either quarter turn, such as a plug or ball type, or may be a sliding gate. With both, a positive means such as a gas-powered actuator is highly desirable. The pressure of the gas within the pipeline (sometimes pressure regulated) is used as a power source for the valve actuator, especially in remote locations. The actuators can be motor-powered or cylinder (vane or piston) type. Sometimes a gas/hydraulic system is used in which gas is directed into a tank containing hydraulic oil and then to a cylinder. A typical gas-operated valve actuator is disclosed in my U.S. Pat. No. 4,380,325.

Motor-powered actuators use a line lubricator to add lubricating oil to the power gas. This oil lubricates the moving parts of the motor and the seals of the control valves. This oil commingles with the exhausting gas and is exhausted to the environment adjacent the actuator. The gas/hydraulic system cylinder actuators exhaust an amount of oil from the intermixing of gas and oil. This amount increases as the seals wear. Cylinder actuators, other than the gas/hydraulic type, use a line lubricator that adds lubricant to the power gas. This oil is contained in the exhaust gas.

The typical one-to-two minute discharge of a mist of lubricating oil into the atmosphere is harmful to the environment. Of even more importance, some pipeline systems have become contaminated with PCB via lubricating oils used in apparatuses such as compressors. These can be discharged along With the actuator lubricating oils. At some locations an odorizer is added to the pipeline gas. If such an actuator exhausts gas with an odor, it can cause the needless Concern of a malfunction or of pipeline damage.

The noise level of gas motor powered actuators has been measured at levels exceeding above 110 decibels. A noise level of below 85 decibels is considered acceptable.

Exhaust gas from actuators concentrated in one location, e.g. at plants such as compressor stations, has been manifolded together and directed to a central scrubber/separator. This practice is only possible when the restriction of the actuator exhaust does not adversely affect the power output of the actuator. At locations where manifolding is not possible, or for those actuators which cannot function with a restricted exhaust, no known scrubber or muffler device has been applied.

Lubricators for valve actuators require periodic filling and maintenance. It is not uncommon during maintenance procedures for there to be some spillage of the lubricating oil.

The prior art discloses a great variety of gas cleaning apparatuses and filters. For example, Perry Equipment Corporation provides a Mighty-Mic FG 372 A Filter Element for ultra fine filtration which removes 98% of particles 0.5 microns and larger with an overall removal of 99.95%.

In accordance with 37 C.F.R. §1.56, the following are disclosed:

"Mighty-Mic (FG-372-A) Filter Element," 1983, describing a gas filter.

"Line Break-ESD Systems, Inc.," 1989, describing valve actuators. This company is co-owned with the present application.

"Limitorque High Pressure Gas Powered Valve Operators," 1983, Limitorque Corporation.

"Type G Brochure High Pressure Gas Actuator," 1989, EIM Company, Inc.

"Shafer Valve Operating Systems," 1980, Shafer Valve Co.

U.S. Pat. No. 4,380,325 discloses a valve actuator.

There has long been a need for efficient, effective, and safe devices and methods for exhausting gas and gas commingled with harmful materials from valve actuators. There has long been a need for a sound reducer for muffling the high level sound of an operating valve actuator exhaust. There has long been a need for devices and methods for recovering oil and other materials from such an exhaust. There has long been a need for devices and methods for re-using such recovered oil.

SUMMARY OF THE PRESENT INVENTION

In one embodiment, the present invention is directed to an actuator exhaust gas scrubber and muffler for cleaning exhaust gas and for separating actuator lubricating oil liquid from the gas. The device has a main upright body containing a cleaning element, e.g., but not limited to, an ultrafine filter. Exhaust gas enters the body through an opening and then strikes a deflector to deflect entrained liquid, e.g., lubricating oil, toward a collection area or sump from which it can be manually removed or automatically recycled back to the actuator. The gas then rises within the body and it may be passed through a mesh or screen prior to being introduced to a chamber containing one or more filter elements. The gas flows to and through the filter elements. In one embodiment, filter elements are used which provide for the filtration of liquids which then flow to a collection area from which they can be recovered. The filtered gas then flows out from the device. A medium for removing odorizing material may be disposed in the gas flow path. One liquid collection area or a plurality of intercommunicating liquid collection areas may be used to efficiently collect the liquids. Appropriate check valves may be employed between collection areas to insure the proper flow path for the collected liquids.

A valve actuator is provided according to the present invention having a scrubber and/or muffler according to the present invention.

It is, therefore, an object of the present invention to provide new, useful, unique, efficient, safe and effective devices and methods for cleaning and muffling gas discharges; in one specific embodiment for discharged from gas-powered valve actuators.

Another object of the present invention is the provision of such devices and methods in which liquids commingled with such gases are collected rather than discharged into the atmosphere.

Yet another object of the present invention is the provision of such methods and devices which permit the re-use of certain collected materials, e.g. actuator lubricating oil.

A further object of the present invention is the provision of such methods and devices which reduce actuator operating sound levels to an acceptable level.

An additional object of the present invention is to provide such methods and devices which remove odorizing materials from gases.

Another object of the present invention is the provision of a device for cleaning gases and methods using such a device.

Yet another object of the present invention is the provision of a valve actuator in which exhaust gases are cleaned and/or the noise level of discharged gas is controlled at an acceptable level.

The present invention recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

FIG. 2 is a schematic view of a manual valve alternative for the device of FIG. 1

FIG. 3 is a side view showing a system according to the present invention.

DESCRIPTION OF EMBODIMENTS PREFERRED AT THE TIME OF FILING FOR THIS PATENT

Figure 1:
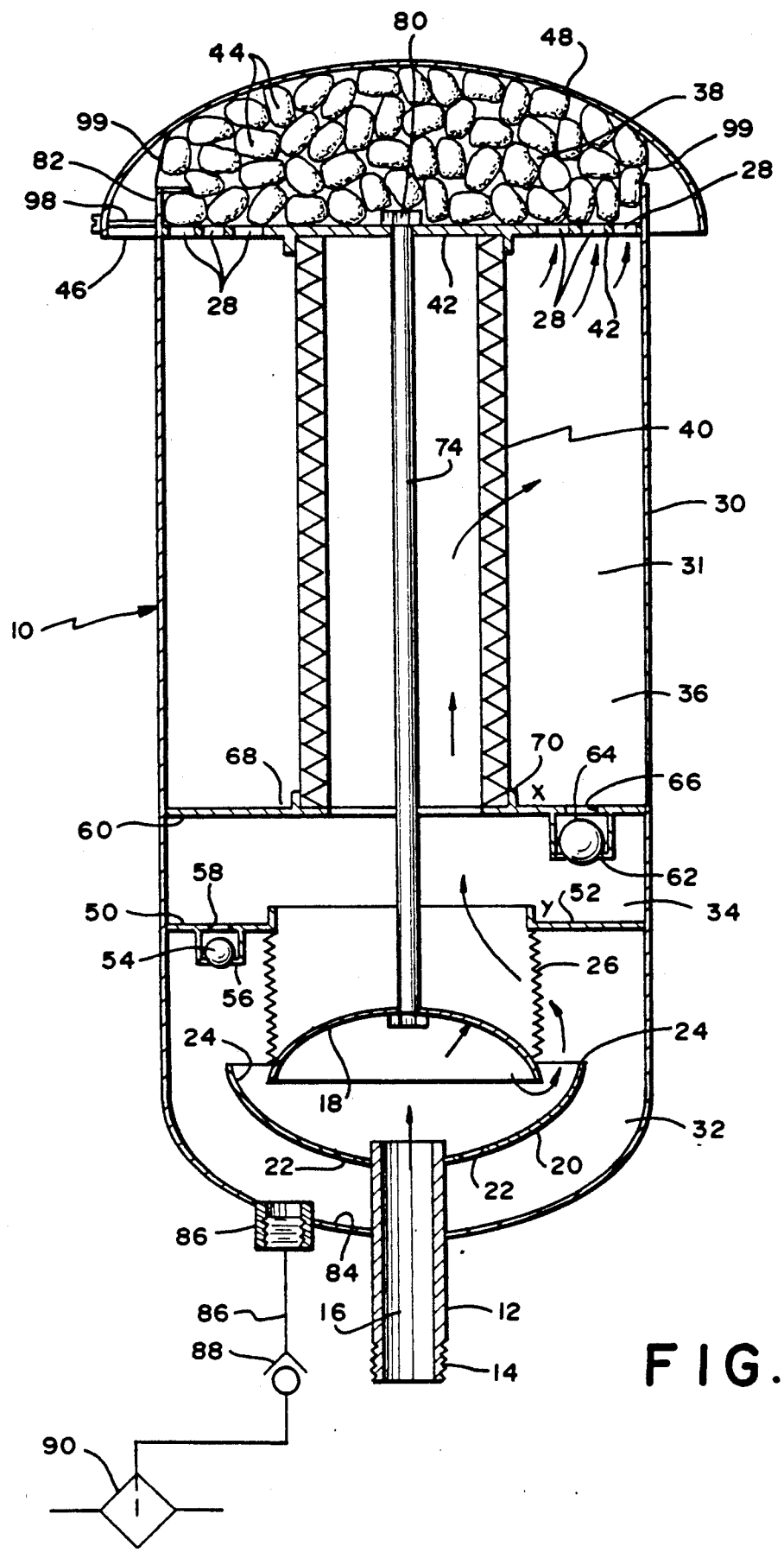
FIG. 1 is a cross-sectional view of a device according to the present invention.

Referring now to FIG. 1, a device 10 according to the present invention has a main body 30 which is generally cylindrical and has a hollow interior 31. The body 30 is divided into a plurality of chambers 32, 34, 36 and 38.

A hollow connector 12 with threads 14 is provided for sealingly connecting the device 10 to an actuator's gas exhaust line (not shown). Exhaust gas flows from the actuator into a channel 16 of the connector 12 and then upwardly to contact a deflector 18 which knocks down some of the liquids entrained in and commingled with the exhaust gas. These liquids flow to a collection plate 20 and then to and through holes 22 in the plate 20 to the chamber 32 from which they may be withdrawn as described in detail below.

After hitting the deflector 18, the gas proceeds through an opening 24 between the deflector 18 and the collection plate 20 upwardly in the chamber 32 where it encounters a wire screen 26, preferably made from stainless steel, for removing particulate matter, preferably of a size of about 0.020 inches and larger (particulate matter such as rust, metal particles, mill scale, etc.) The wire screen also acts as a baffle for removing liquids which drain down from the screen into the chamber 32. The gas then continues its upward flow into and then through a filter element 40, into the chamber 36, and out through holes 28 in a plate 42 at the top of the chamber 36. The gas then passes through a bed of activated charcoal 44 which removes odorizing material in the gas prior to discharge of the gas through a space 46 between the body 30 and a top cover 48. The cover 48 is connected to the body by several bolts 98 (one shown). The body 10 has a plate 50 welded thereacross which defines the upper limit of the chamber 32. The wire mesh 26 is connected at its top to the plate 50. Liquids collected in a collection sump 52 are permitted to flow downwardly out of the sump 52 when a movable ball 54 of a check valve 56 moves away from a valve opening 58 in the plate 50. This occurs when there is insufficient gas pressure in the chamber 32 to hold the ball 54 in sealing contact across the opening 58. The ball 54 seals shut the opening 58 when gas pressure is sufficient. Gas flows upwardly through an opening 57 in the plate 50 into the chamber 34.

Similarly, a plate 60 welded across the body 10 defines the upper limit of the chamber 34 and a check valve 62 with a movable ball 64 across a valve opening 66 controls liquid flow through the opening 66. When gas pressure is sufficient, the ball 64 moves to close off the opening 66 so that gas cannot flow therethrough and into the chamber 36 without going through the filter element 40. Liquids collected in a collection sump 68 may flow downward through the opening 66 when gas pressure is reduced sufficiently to permit the ball 64 to move away from sealing contact across the opening 66.

The filter element 40 is disposed between the plates 42 and 60 and extends from one end of the chamber 36 to the other. It is preferred that this filter element be of the liquid coalescing type so that liquids, including aerosol mist in the exhaust gas, may be coalesced thereby for flow downwardly (both interiorly and exteriorly thereof) from the filter element. A ridge 70 on the plate 60 and a ridge 72 on the plate 42 facilitate correct disposition of the filter element 40. A bolt 74 extending through a hole 76 in the deflector 18 and a hole 78 in the plate 42 is removably secured with a nut 80 to hold the element 40 securely in place.

An upwardly extending wall 82 defines a container for holding the activated charcoal 44 above the plate 42. In one embodiment the wall 82 extends upwardly about 2 inches. The charcoal is also held by a wire mesh screen 99 (preferably made of stainless steel) placed over the charcoal. The velocity of the gas is steadily decreased as it moves through the filter 10; e.g. a typical actuator exhaust pipe is 1 inch in diameter but with a device according to this invention the exhaust area is about 100 times that of the 1 inch diameter pipe. The pressure of exhaust gas is reduced as it moves through a device according to the present invention. For example, a filter 10 may receive gas at 25 to 75 p.s.i.g. and discharge it at about 1 to about 5 p.s.i.g. Typical pipeline pressure is about 1,000 p.s.i. Noise levels are reduced and, in certain preferred embodiments, reduced by approximately 50%.

Oil and other liquids collected in sump 68 and sump 52 drain downwardly into a sump 84 in the chamber 32 when exhaust gas is no longer entering the filter 10. A connector 86 permits these liquids, including lubricating oil, to flow from the sump 84, through a line 86, through a check valve 88, and back to an actuator lubricator 90. The check valve 88 is maintained closed by the pressure of gas actuating the valve and, when that pressure is relieved, flow back to the lubricator is permitted.

In another embodiment, FIG. 2, liquids can be removed manually from the sump 84 by using a manual valve 92 on the line 86.

FIG. 3 illustrates a valve actuator 100 according to the present invention which has an actuator 102, e.g., but not limited to, an E.I.M. Type G actuator, with an exhaust line 104 to which is secured to a filter 106 like the device 10 previously described. Oil is recycled to a lubricator 108 through a line 110 (corresponding to the line 86 of FIG. 1). Line 112 is a vent line for an outboard bearing 113 and line 112 conveys gas (with entrained material, if any) from the bearing 113 to the filter 106.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

What is claimed is:

1. A device for treating a gaseous discharge from an apparatus, the gaseous discharge including gas and liquid entrained therein, the device comprising
    a hollow body having an inlet for receiving the gaseous discharge from the apparatus and an outlet from which treated gas exits the body,
    liquid separation means within the hollow body through which the gaseous discharge flows for separating the liquid entrained in the gaseous discharge from the gas,
    liquid collection means within the hollow body for collecting separated liquid, the liquid collection means including a plurality of liquid collection sumps, one disposed above the other, each communicating with adjacent sumps, separated liquid following into a bottom-most sump,
    valve means between sumps for controlling liquid flow therebetween, and
    the liquid collection means having a liquid outlet from which separated liquid is discharged from the hollow body.

2. The device of claim 1 including also
    odorant removal means within the hollow body for removing odorizing material in the gaseous discharge.

3. The device of claim 1 wherein the apparatus is a gas-powered actuator for a valve and the actuator has a lubricator for lubricating the actuator; the separated liquid containing lubricating oil from the actuator and wherein the device includes
    feed means for feeding the separated liquid back to the lubricator for re-use thereby in lubricating the actuator.

4. The device of claim 1 wherein gaseous discharge is discharged at a first noise level and the device muffles the discharge and reduces its noise level to a second level lower than the first noise level.

5. The device of claim 1 wherein the liquid separation means includes
    a wire mesh baffle through which the gaseous discharge flows before it is discharged from the hollow body, liquid collecting thereon, which liquid flows to the liquid collection means.

6. The device of claim 1 wherein the liquid separation means includes
    a liquid-separating filter element through which the gaseous discharge flows before it is discharged from the hollow body, liquid collecting on the filter element and then flowing to the liquid collection means.

7. The device of claim 1 wherein the liquid collection means includes
    a sump at the bottom of the hollow body into which separated liquid flows, the liquid outlet connected communicatively to the sump.

8. The device of claim 1 including also
    manually-operated valve means interconnected with the liquid outlet for controlling the flow of separated liquid therefrom.

9. The device of claim 1 wherein the valve means prevent liquid flow between sumps while the apparatus is operating.

10. The device of claim 1 wherein the liquid separation means includes deflector means for impact by the gaseous discharge to knock down entrained liquid therefrom, the knocked down liquid flowing to the liquid collection means.

11. A device for treating a gaseous discharge from a gas-powered actuator for a valve and for muffling noise of such a discharge, the actuator having a lubricator for lubricating the actuator, the gaseous discharge including gas and liquid entrained therein, the device comprising
    a hollow body having an inlet for receiving the gaseous discharge from the apparatus and an outlet from which treated gas exits from the body,
    liquid separation means within the hollow body through which the gaseous discharge flows for separating the liquid entrained in the gaseous discharge from the gas, the separated liquid containing lubricating oil from the actuator,
    liquid collection means within the hollow body for collecting separated liquid, the liquid collection means including a plurality of liquid collection sumps, one disposed above the other, each communicating with adjacent sumps, separated liquid flowing into a bottom-most sump,
    valve means between sumps for controlling liquid flow therebetween, the liquid collection means having a liquid outlet from which separated liquid is discharged from the hollow body, the liquid outlet in fluid communication with the bottom-most sump, and odorant removal means within the hollow body for removing odorizing material in the gaseous discharge.

12. A gas-powered actuator for actuating a valve interconnected thereto, the valve for controlling the flow of a gas therethrough, the actuator comprising, actuator mechanism for actuating the valve, the actuator mechanism powered by the gas, an exhaust line from the actuator for exhausting the gas that powers the actuator as well as any material entrained in the gas, and p1 a device for treating the gas, the device comprising, a hollow body having an inlet for receiving the gas from the exhaust line and an outlet from which treated gas exits from the body, liquid separation means within the hollow body through which the gas flows for separating liquid entrained in the gas from the gas, liquid collection means within the hollow body for collecting separated liquid, the liquid collection means having a liquid outlet from which separated liquid is discharged from the hollow body, the liquid collection means including a plurality of liquid collection sumps, one disposed above the other, each communicating with adjacent sumps, separated liquid flowing into a bottom-most sump, and valve means between sumps for controlling liquid flow therebetween.

13. A gas-powered actuator for actuating a valve interconnected thereto, the actuator having a lubricator for lubricating the actuator with oil, the valve for controlling the flow of a gas therethrough, the actuator comprising, actuator mechanism for actuating the valve, the actuator mechanism powered by the gas, an exhaust line from the actuator for exhausting the gas that powers the actuator as well as any materials entrained in the gas, and a device for treating the gas, the device comprising, a hollow body having an inlet for receiving the gas from the exhaust line and an outlet from which treated gas exits from the body, liquid separation means within the hollow body through which the gas flows for separating liquid entrained in the gas from the gas, the separated liquid including lubricating oil from the actuator, liquid collection means within the hollow body for collecting separated liquid, the liquid collection means having a liquid outlet from which separated liquid is discharged from the hollow body, liquid collection means including a plurality of liquid collection sumps, one disposed above the other, each communicating with adjacent sumps, separated liquid flowing into a bottom-most sump, valve means between sumps for controlling liquid flow therebetween, and means for feeding the separated liquid back to the lubricator for re-use thereby in lubricating the actuator.

* * * * *